(12) United States Patent
Heisner et al.

(10) Patent No.: US 11,117,701 B2
(45) Date of Patent: Sep. 14, 2021

(54) CONTAINER WITH RECESSED BASE AND CONCAVE RIB

(71) Applicant: GRAHAM PACKAGING COMPANY, L.P., Lancaster, PA (US)

(72) Inventors: David B. Heisner, York, PA (US); Edward J. Roubal, III, Stewartstown, PA (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 680 days.

(21) Appl. No.: 16/013,454

(22) Filed: Jun. 20, 2018

(65) Prior Publication Data

US 2019/0389616 A1    Dec. 26, 2019

(51) Int. Cl.
*B65D 1/02* (2006.01)
*B29C 49/36* (2006.01)
(Continued)

(52) U.S. Cl.
CPC ............ *B65D 1/0276* (2013.01); *B29C 49/04* (2013.01); *B29C 49/36* (2013.01); *B65D 1/0207* (2013.01);
(Continued)

(58) Field of Classification Search
CPC .. B65D 1/0276; B65D 1/0261; B65D 1/0223; B65D 1/0207; B65D 79/0081;
(Continued)

(56) References Cited

U.S. PATENT DOCUMENTS 3,718,229 A * 2/1973 Wyeth .................. B65D 1/0276
215/373
3,811,588 A * 5/1974 Vermeerbergen .... B65D 1/0223
215/373
(Continued)

FOREIGN PATENT DOCUMENTS

DE    102005011804 A1    12/2006
WO   WO 2013/025463 A1    2/2013

OTHER PUBLICATIONS

International Search Report and Written Opinion dated Jun. 27, 2019 in International Application No. PCT/US2019/027661.

*Primary Examiner* — Robert J Hicks
(74) *Attorney, Agent, or Firm* — Stradley Ronon Stevens & Young, LLP (57) ABSTRACT

A container including a body having a base defining a closed end, a finish defining an opposite open end, and a sidewall between the base and finish. The base includes a support surface defining a reference plane and a contoured base recess extending inwardly from the support surface to a maximum base recess height "$h_{brmax}$" from the plane. The sidewall includes a concave rib extending circumferentially around the body. A center of the rib is disposed at a rib height "$h_r$" from the plane. The ratio "$h_{brmax}$:$h_r$" is between 1:3 and 1:5. The rib includes a radiused transition surface extending from the base to an angled inner surface and having a radius of curvature "$r_1$" of at least 0.10 inches. The angled inner surface has an angle "a" relative to the plane of between 28 and 80 degrees. A method and mold assembly for making the container are also provided.

20 Claims, 8 Drawing Sheets

(51) Int. Cl.
*B29C 49/04* (2006.01)
*B29L 31/00* (2006.01)

(52) U.S. Cl.
CPC ............... *B29L 2031/7158* (2013.01); *B65D 2501/0036* (2013.01)

(58) Field of Classification Search
CPC .... B65D 79/008; B65D 79/005; B65D 11/22; B65D 11/20; B29C 49/04; B29C 49/36; B29C 49/30; B29C 49/28
USPC .............. 215/373, 372, 371, 376, 382, 379; 220/624, 623, 608, 609, 675, 669
See application file for complete search history.

(56) References Cited

U.S. PATENT DOCUMENTS

| | | | |
|---|---|---|---|
| 4,108,324 A * | 8/1978 | Krishnakumar | B65D 1/0276 215/373 |
| 4,249,666 A * | 2/1981 | Hubert | B65D 1/0276 215/373 |
| 5,704,503 A | 1/1998 | Krishnakumar et al. | |
| 9,296,539 B2 | 3/2016 | Wright et al. | |
| 2010/0140838 A1 | 6/2010 | Kelley et al. | |
| 2011/0017700 A1 | 1/2011 | Patcheak et al. | |
| 2012/0118899 A1 | 5/2012 | Wurster et al. | |
| 2014/0183202 A1 | 7/2014 | Hanan | |

\* cited by examiner

CONTAINER WITH RECESSED BASE AND CONCAVE RIB

BACKGROUND

Field of the Disclosed Subject Matter

The present disclosed subject matter relates to base and rib configurations for plastic containers, as well as containers having such base and rib configurations, and making and using the same. For example, the disclosed subject matter includes plastic containers having rib and base portions constructed and operative to accommodate various manufacturing and processing constraints.

Description of Related Art

Plastic containers used for filling with beverages, juices, sauces, etc., often are hot-filled and then cooled to room temperature or below for distribution. During the process of hot-filling and quenching, the container is subjected to different thermal and pressure scenarios that can cause deformation. Functional improvements can be incorporated to the container design to accommodate for different thermal effects and pressures (positive and negative), so as to control, reduce or eliminate unwanted deformation thus making the package both visually appealing and functional for downstream situations. Functional improvements can include one or more concave ribs circumferentially disposed within the sides of a container. Generally, ribs located near the base of the container can be desirable for preventing deformation, rather than ribs only located near the middle or top portions. Further functional improvements can include a pronounced recessed base into the bottom of the container. Generally, the combination of a pronounced recess base and one or more ribs can improve the structural characteristics of the container to a greater extent than either feature individually. However, existing or current technologies for rib and base configurations may not be satisfactory from a manufacturing perspective. For example, a conventional manufacturing process for fabricating plastic containers is an extrusion blow molding process, in which a continuously-extruded hot plastic tube or parison is captured within a mold and inflated against the inner surfaces of a mold to form a container blank. The mold is typically designed to travel at the speed at which the parison is extruded so as to close on the parison to allow the process to operate on a continuous basis. Several different types of extrusion blow molding machines are available, including shuttle molds designed to travel in a linear motion and extrusion blow molding wheels that travel in a rotary or circular motion. One type of molding wheel is a vertical rotation wheel used for high-output production of a wide variety of plastic extrusion blow molded containers. In a vertical rotation wheel, a series of two-piece mold cavities rotate vertically around a central axis (e.g., similar to a Ferris wheel) and a formed container is ejected near the top of the wheel. During ejection, the two mold halves of the mold cavity are separated such that a container captured in the top half is released, e.g. from the force of gravity, into a transport mechanism for further processing. However, various rib and base configurations desirable for container strength, such as a low rib and a pronounced base, can delay or prevent a container from releasing from the mold cavity in a timely manner.

Thus, there is a need for a base and rib configuration with suitable geometries to provide satisfactory strength against pressure-inducing deformation and improved manufacturability in blow-molding machines.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, a container is provided, as well as a method of making the container and a mold assembly to form the container.

As embodied herein, a container of the disclosed subject matter includes a body having a compartment defined therein, the body including a base portion defining a closed end, a finish portion defining an open end opposite the base portion, and a sidewall between the base portion and the finish portion. The base portion includes a support surface defining a reference plane and a contoured base recess extending inwardly from the support surface to a maximum base recess height "$h_{brmax}$" from the reference plane. The sidewall includes a concave rib extending circumferentially around the body, wherein a center of the concave rib in side cross-section is disposed at a rib height "$h_r$" from the reference plane, and the ratio of the maximum base recess height to the rib height "$h_{brmax}:h_r$" is between 1:3 and 1:5. The concave rib in side cross-section includes a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees.

As embodied herein, the concave rib in side cross-section can have an overall depth "d" of 0.15 inches to 0.20 inches from the outer edge of the sidewall. The ratio of $h_{brmax}:h_r$ can be about 1:5. The radius of curvature, $r_1$, can be about 0.10 inches.

Additionally, and as embodied herein, the angle "a" can be about 28 degrees. The concave rib in side cross-section can have a radiused concave surface extending from the angled surface, the radiused concave surface can have a radius of curvature "$r_2$," of at least 0.01 inches. The overall height of the container from the reference plane to an upper edge of the finish portion can be "h" and an overall width of the container can be "w," and the ratio of the overall height to overall width "h:w" can be about 2.9:1.

Furthermore, the container can be made of a variety of suitable polymeric materials. For example, the polymeric material can be selected from the group of high density polyethylene, medium density polyethylene, low density polyethylene, polypropylene, polycarbonate, polystyrene, extrudable polyethylene terephthalate, and mixtures, blends, or copolymers thereof. The container can be a blow-molded article formed from a mold assembly operatively coupled to a vertical rotation wheel.

In accordance with another aspect of the disclosed subject matter, a method of making a container is provided including disposing a polymeric material in a mold assembly having a cavity configured to form a container comprising a body having a compartment defined therein. The body includes a base portion defining a closed end, a finish portion defining an open end opposite the base portion, and a sidewall between the base portion and the finish portion. The base portion includes a support surface defining a reference plane and a contoured base recess extending inwardly from the support surface to a maximum base recess height "$h_{brmax}$" from the reference plane. The sidewall includes a concave rib extending circumferentially around the body between the base portion and the sidewall, wherein a center of the concave rib in side cross-section is disposed at a rib height "$h_r$" from the reference plane, wherein the ratio of the maximum base recess height to the rib height "$h_{brmax}$:$h_r$" is between 1:3 and 1:5. The concave rib in side cross-section includes a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees. The method further includes inflating the polymeric material in the mold assembly to form a blow-molded article having a configuration conforming to the cavity and removing the article from the mold assembly.

Furthermore, in accordance with another aspect of the disclosed subject matter, a mold assembly is provided to form a container, the mold assembly including a plurality of mold sections. The plurality of mold sections, when assembled, define a cavity configured to form a container. The container includes a body having a compartment defined therein. The body includes a base portion defining a closed end, a finish portion defining an open end opposite the base portion, and a sidewall between the base portion and the finish portion. The base portion includes a support surface defining a reference plane and a contoured base recess extending inwardly from the support surface to a maximum base recess height "$h_{brmax}$" from the reference plane. The sidewall includes a concave rib extending circumferentially around the body between the base portion and the sidewall, wherein a center of the concave rib in side cross-section is disposed at a rib height "$h_r$" from the reference plane, wherein the ratio of the maximum base recess height to the rib height "$h_{brmax}$:$h_r$" is between 1:3 and 1:5. The concave rib in side cross-section includes a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees. The mold assembly disclosed herein can be provided on a vertical rotation wheel for high capacity output.

It is to be understood that both the foregoing general description and the following detailed description are exemplary and are intended to provide further explanation of the disclosed subject matter.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION OF THE PREFERRED EMBODIMENT

The disclosed subject matter presented herein may be used for containers, including plastic containers, such as plastic containers for liquids. The disclosed subject matter generally is directed to a base and rib configuration suitable for internal pressure variations such as arising from elevated temperature processing, including hot-filling, pasteurization and/or retort processing. The containers described herein can be formed from materials including, but not limited to, high density polyethylene, medium density polyethylene, low density polyethylene, polypropylene, polycarbonate, polystyrene, extrudable polyethylene terephthalate, and mixtures, blends, or copolymers thereof.

In accordance with the disclosed subject matter, a container is provided including a body having a compartment defined therein. The body includes a base portion defining a closed end, a finish portion defining an open end opposite the base portion, and a sidewall between the base portion and the finish portion. The base portion includes a support surface defining a reference plane and a contoured base recess extending inwardly from the support surface to a maximum base recess height "$h_{brmax}$" from the reference plane. The sidewall includes a concave rib extending circumferentially around the body, wherein a center of the concave rib in side cross-section is disposed at a rib height "$h_r$" from the reference plane, wherein the ratio of the maximum base recess height to the rib height "$h_{brmax}$:$h_r$" is between 1:3 and 1:5. The concave rib in side cross-section includes a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees.

As disclosed herein, the geometric configuration of a container base allows for the improved high capacity manufacture of a container having a relatively low rib location on a sidewall and a relatively pronounced base recess height without sacrificing strength or performance. The low rib and pronounced base are desirable features because they can increase the structural strength of a container. However, these features can also lead to a manufacturing complication, e.g. inhibiting release of the container from a mold. The base configuration disclosed herein advantageously overcomes these complications. For example, the geometric rib configuration of the disclosed subject matter allows the container to release more readily from a mold during manufacture for high capacity output, without jeopardizing strength or performance of the container.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the base and container with the disclosed subject matter are shown in the accompanying figures. The base and rib are suitable for the manufacture of containers such as, bottles, jars and the like. Such containers incorporating the base and rib can be used with a wide variety of perishable and nonperishable goods. However, for purpose of understanding, reference will be made to the use of the base and rib for a container disclosed herein with liquid or semi-liquid products such as sodas, juices, sports drinks, energy drinks, teas, coffees, sauces, dips, jams and the like, wherein the container can be filled with a hot liquid or non-contact (i.e., direct drop) filler, such as a non-pressurized filler, and further used for transporting, serving, storing, and/or re-using such products while maintaining a desired shape, including providing a support surface for standing the container on a table or other substantially flat surface. Containers having a base and rib described herein can be further utilized for sterilization, such as retort sterilization, and pasteurization of products contained therein. The container can have a base and rib configuration to provide improved structural support from applied forces, for example resulting from pressurized filling, sterilization or pasteurization and resulting thermal expansion due to hot liquid contents and/or vacuum deformation due to cooling of a liquid product filled therein. Furthermore, the container can have a base and rib configuration to provide improved ejection during manufacturing, for example, during extrusion blow molding manufacturing in a vertical rotation wheel.

For purpose of illustration, and not limitation, reference will be made herein to a container incorporating a base and rib can be manufactured by extrusion blow molding in a vertical rotation wheel, and then hot-filled with a liquid product, such as tea, sports drink, energy drink or other similar liquid product.

Plastic containers according to embodiments of the disclosed subject matter can be of any suitable size. For example, embodiments include containers with internal volumes sized to contain 8 fluid ounces, 11 fluid ounces, or 24 fluid ounces. Also, container sizes can include single-serving and multiple-serving size containers.

Hot-fill processing can include filling a product into a container at any temperature in a range of at or about 130° F. to at or about 205° F. or in a range of at or about 185° F. to at or about 205° F. For example, a container can be filled with a hot product at a temperature of at or about 185° F. As needed, the hot-fill temperature can be above 205° F.

Additionally or alternatively, plastic containers according to the disclosed subject matter can be subjected to through processing, such as pasteurization and/or retort processing. Other known or suitable processing techniques also can be used with the container of the disclosed subject matter.

Figure 1:
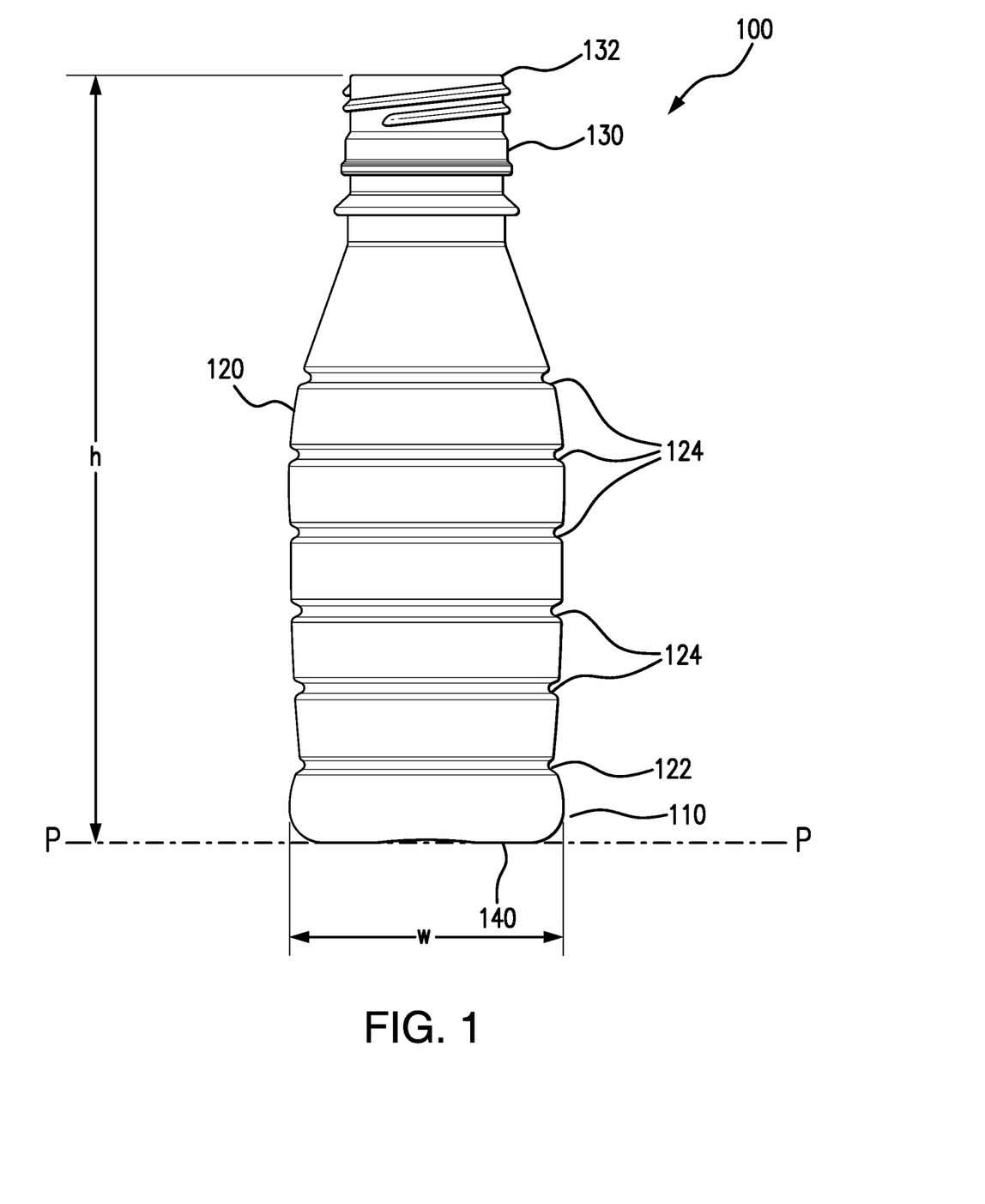
FIG. 1 is a front view of an exemplary container according to the disclosed subject matter.

Reference will now be made in detail to the various exemplary embodiments of the disclosed subject matter, exemplary embodiments of which are illustrated in the accompanying drawings. For purpose of explanation and illustration, and not limitation, FIGS. 1-6 illustrate various aspects of a container body 100 of the disclosed subject matter. Referring now to FIG. 1, a front view of a container body 100 is provided. For example, and as embodied herein, container body 100 is configured to undergo elevated temperature processing, such as hot-filling, pasteurization, and/or retort processing, and also configured to undergo cooling processing and/or cool-down operations. For example, container body 100 is structurally configured to accommodate a hot-filling and cooling process. Container body 100 is further configured to be formed in an extrusion blow molding process, for example, through the use of a vertical rotation wheel.

According to the disclosed subject matter, and as embodied herein, container body 100 includes a compartment defined therein. The compartment can be any suitable size, for example, container body 100 can include internal volumes configured to contain fluids of between about 8 fluid ounces and about 24 fluid ounces or more. Container body 100 can be formed from any suitable materials such as polymeric materials capable of being blow-molded. For example, the polymeric material can include but not be limited to, a material selected from the group of high density polyethylene, medium density polyethylene, low density polyethylene, polypropylene, polycarbonate, polystyrene, extrudable polyethylene terephthalate, and mixtures, blends, or copolymers thereof.

As embodied herein, container body 100 includes a base portion 110 defining a closed end, a finish portion 130 defining an open end opposite the base portion 110, and a sidewall 120 between the base portion and the finish portion. The base portion includes a support surface 140 defining a reference plane P.

Support surface 140 can provide a generally continuous surface to balance or stand container body 100 on a surface such as a shelf or countertop. Additionally or alternatively, the support surface 140 can have a plurality of segments spaced about the circumference of the base portion, such that reference plane P is defined by the bottom of the plurality of segments. The support surface 140 can have a planar portion or be provided with an outwardly convex arcuate shape such that a bottom tangential plane defines reference plane P.

Generally, the sidewall 120 can have a variety of suitable shapes, with various features to enhance aesthetics, strength or performance. As disclosed herein, the sidewall 120 includes a concave rib 122 extending circumferentially around the body 100 proximate the base portion 110. Furthermore, and as embodied herein, sidewall 120 can include one or more circumferential ribs 124 separate from the lower concave rib 122. As embodied herein, the concave rib 122 is disposed below the circumferential ribs 124, so as to be closer to the base portion than the circumferential ribs 124. Further, the plurality of circumferential ribs 124 can have dimensions the same as or different than the concave rib 122. As embodied herein the concave rib 122 and the circumferential ribs 124 can be configured to restrict or resist radial distortion, such as paneling, denting, barreling, ovalization, and/or other unwanted deformation of sidewall 120 during elevated temperature processing, such as hot-filling, pasteurization, and/or retort processing. The concave rib 122 and the circumferential ribs 124 can also be configured to aid in enhanced axial and top loads, such as by including fluted or column configurations therein. Furthermore, the dimensions and profile of the circumferential ribs 124 can be selected as desired for an intended use. Additional details of the concave rib dimensions and profile of the disclosed subject matter are set forth in detail below.

The overall height of the container from the reference plane P to an upper edge 132 of the finish portion 130 can be "h," and an overall width of the container can be "w," and, as embodied herein, the ratio of the overall height to overall width "h:w" can be about 3:1, such as about 2.9:1. For example and not limitation, container body 100 can have an overall height h of about 6.9 inches and an overall width w of about 2.4 inches, although a wide variety of other sizes and dimensions are also contemplated.

Figure 2:
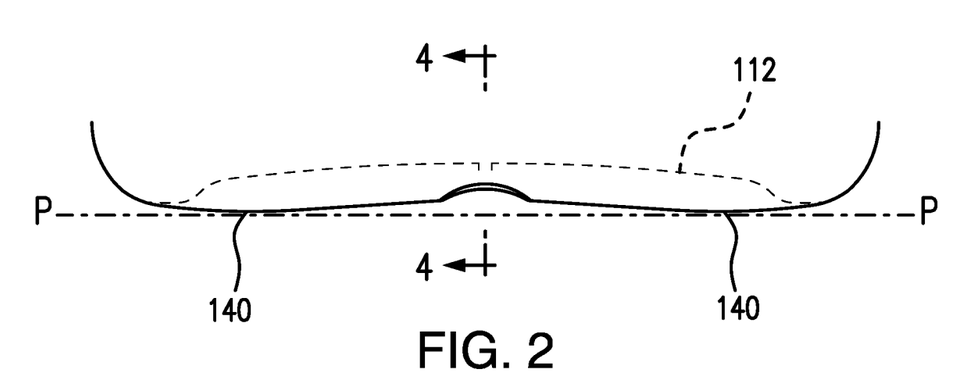
FIG. 2 is an enlarged side view of a base portion of the exemplary container of FIG. 1.
Figure 3:
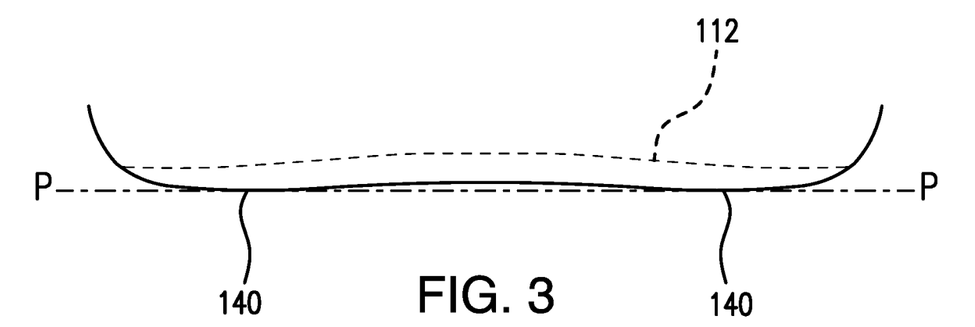
FIG. 3 is an enlarged front view of the base portion of the exemplary container of FIG. 1.
Figure 4:
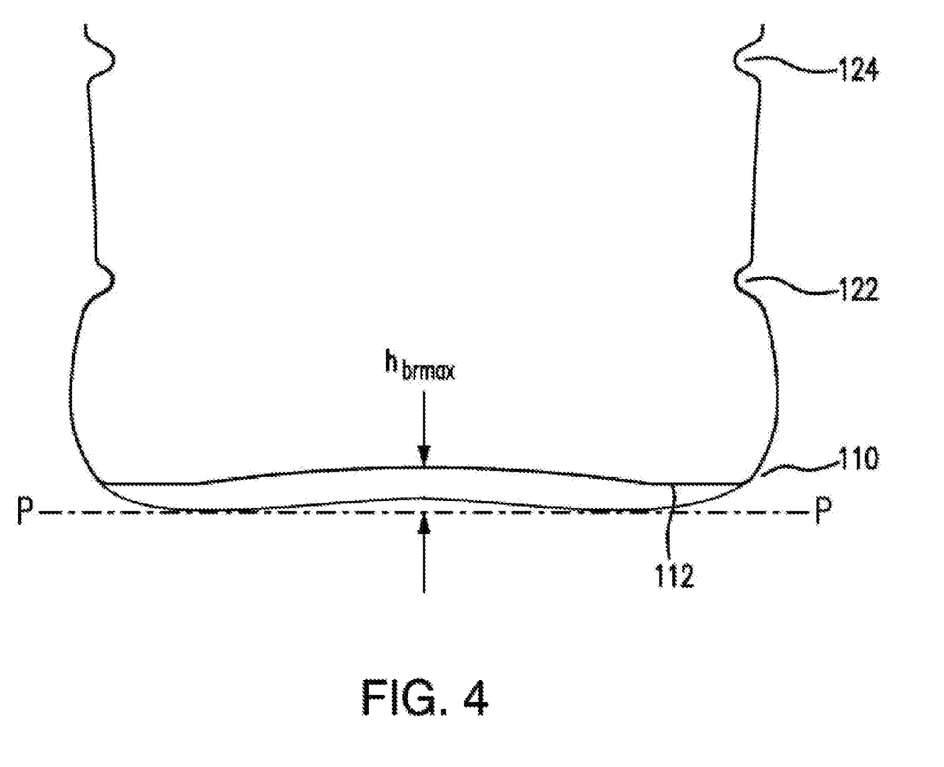
FIG. 4 is a cross-sectional front view along line 4-4 of a lower portion of the exemplary container of FIG. 1.
Figure 6:
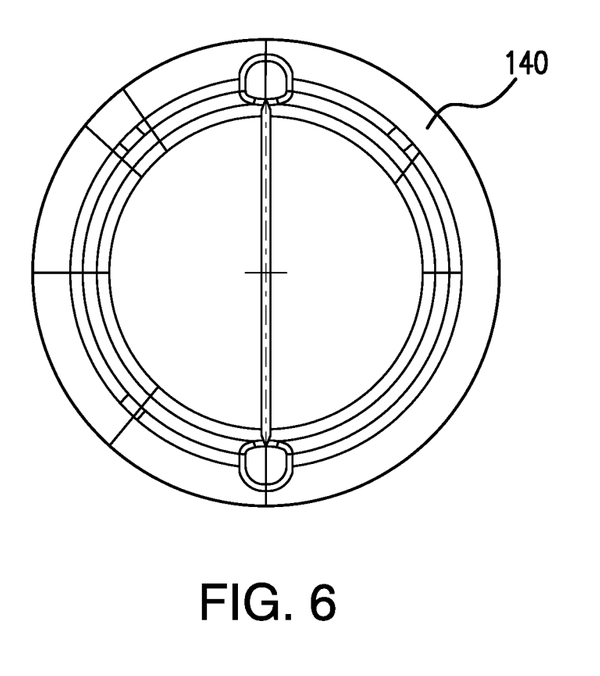
FIG. 6 is a bottom view of the exemplary container of FIG. 1.

According to aspects of the disclosed subject matter, and as embodied herein, the finish portion 130 can be capped or sealed using any suitable closure (not shown) such as a plastic or metallic threaded cap or lid, a foil seal, a lug closure, a plastic or metallic snap-fit lid or cap. For example, finish portion 130 can include a threaded portion configured to receive a plastic or metallic threaded cap or lid. Finish portion 130 can have any suitable diameter in plan view, such as between about 1.0 and about 2.0 inches for example and not limitation. With reference to FIGS. 2 and 3, an enlarged side view and front view, respectively, of the base portion 110 are provided for further illustration and understanding of the container body 100 of FIG. 1. The base portion 110 includes a contoured base recess 112 extending inwardly from the support surface 140 as depicted in hidden lines. The contoured base recess 112 can have a variety of suitable shapes, depending upon intended purpose. For example, the contoured base recess 112 can be configured to function as a diaphragm so as to flex and accommodate for pressure differentials. Alternatively, the contoured base recess 112 can have a more robust configuration, such as a conical shape to enhance strength. Additionally, the contoured base recess 112 can include one or more seams and/or recessed features as depicted in FIG. 2 and FIG. 6 to enhance, enable, or otherwise blow-molding of the container. FIG. 6 illustrates a bottom view of the container body 100 of FIG. 1, including the support surface 140 with recessed features along a center seam. For purpose of illustration and not limitation, and with reference to FIG. 4, a cross-sectional partial view of a lower portion of the container body 100 is provided. FIG. 4 is a view along section line 4-4 of FIG. 2. Particularly, FIG. 4 shows a cross-section of the concave rib 122 and one of the plurality of circumferential ribs 124, with a back half of the container visible and extending below the contoured base recess 112. As embodied herein, the circumferential ribs 124 can include a concave, symmetric, and sideways U-shaped profile protruding into the sidewall 120 when viewed in side cross-section. Further, the contoured base recess 112 extends inwardly to a maximum base recess height "$h_{brmax}$" from the reference plane P. Although the maximum base recess height "$h_{brmax}$" as depicted herein corresponds to the center seam, it is recognized that the maximum recess height (e.g. depth) can align with other features of the contoured base recess 112, depending upon the configuration.

Figure 5:
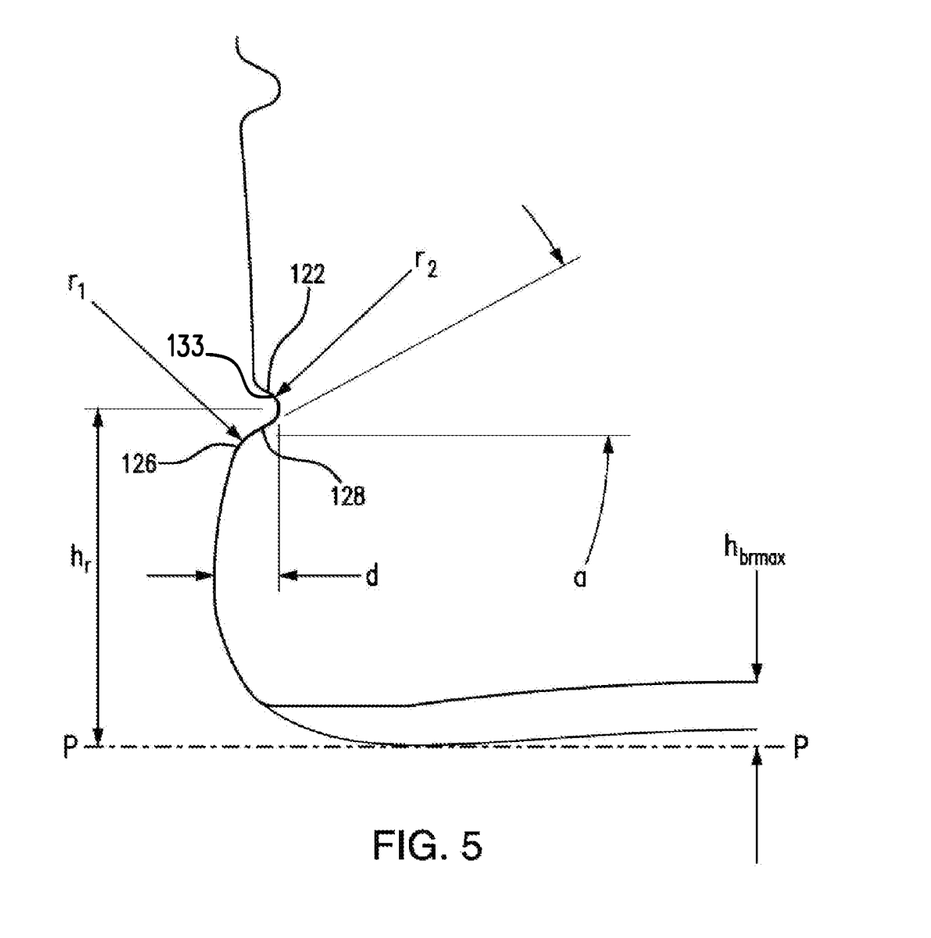
FIG. 5 is a partial cross-sectional front view of the lower portion of the exemplary container of FIG. 1.

As embodied herein, FIG. 5 illustrates a detailed cross-sectional partial view of FIG. 4. As shown, a center of the concave rib 122 in side cross-section is disposed at a rib-height "$h_r$" from the reference plane P. In accordance with the disclosed subject matter, the ratio of the maximum base recess height to the rib height "$h_{brmax}$:$h_r$" is between 1:3 and 1:5. For example, and as embodied herein, $h_{brmax}$:$h_r$ can be about 1:5. Such a configuration provides unique and surprising advantages for release of the container of the disclosed subject matter from a mold assembly. That is, and as described further below, such a ratio of dimensions allows for the benefits of the recess and rib configuration, e.g. strength and performance, while facilitating the release of the container from a mold assembly.

Further in accordance with the disclosed subject matter, and with reference to FIG. 5, the concave rib 122 in side cross-section includes a radiused transition surface 126 extending from the base portion 110 to an angled inner surface 128. The radiused transition surface 126 has a radius of curvature "$r_1$" of at least 0.10 inches. For example, $r_1$ can be about 0.10 inches. Additionally, the angled inner surface 128 has an angle "a" relative to the reference plane of between 28 degrees and 80 degrees. For example, and as embodied herein, angle "a" can be about 28 degrees.

Still referring to FIG. 5, the concave rib 122 in side cross-section has an overall depth "d" of 0.15 inches to 0.20 inches from the outer edge of the sidewall 120. Further, the concave rib 122 in side cross-section can have a radiused concave surface 133 extending from the angled inner surface 128. In particular, the radiused concave surface 133 can have a radius of curvature "$r_2$," of at least 0.01 inches. As with the ratio of the maximum base height to the rib height "$h_{brmax}$:$h_r$," the configuration of the concave rib profile likewise enhances release of the container of the disclosed subject matter from a mold assembly without impairing strength or performance of the container as described further below.

Figure 7:
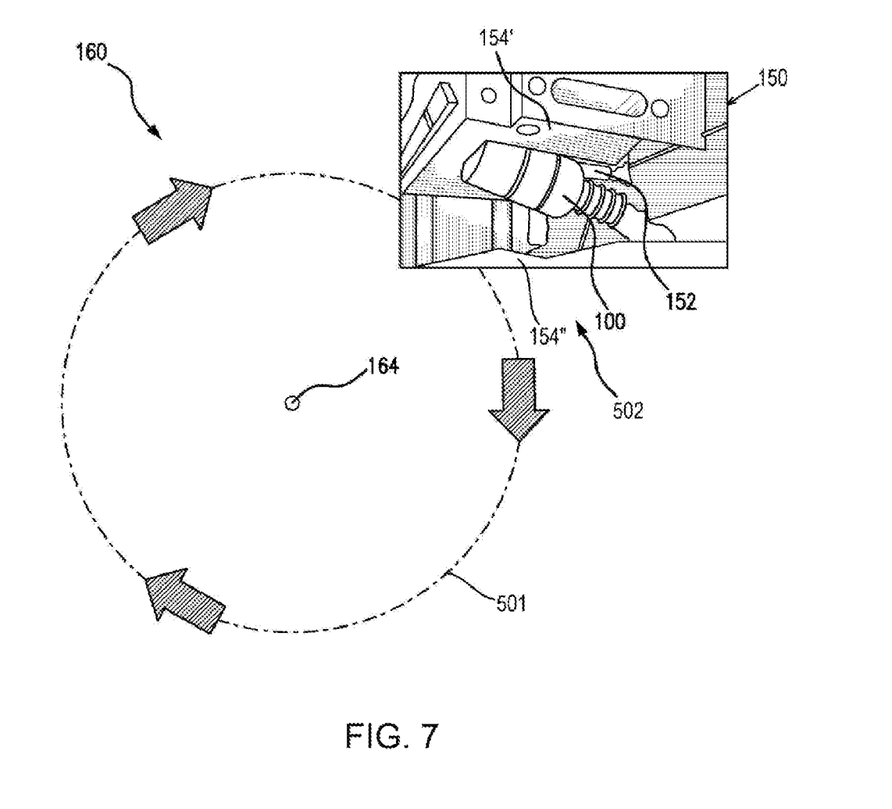
FIG. 7 is a schematic view of a container of the disclosed subject matter being released from an upper mold half of a mold assembly on a vertical rotation wheel.

Further in accordance with the disclosed subject matter a method of and mold assembly for making such a container as described above are provided. For purpose of understanding and with reference to FIG. 7, an exemplary method of and mold assembly for making the container body 100 of FIG. 1 are illustrated. With reference to FIG. 7, a method of making the container includes disposing a material in a mold assembly 150 having a cavity 152 configured to form the container body 100. The mold assembly 150 includes a plurality of mold sections 154', 154" when closed or assembled together, defining a cavity 152 configured to form the container 100. For purpose of illustration and not limitation, and as shown in FIG. 7, the mold assembly 150 can be provided on a vertical rotation wheel 160. The vertical rotation wheel 160 can include a plurality of mold assemblies rotating around a central axis 164. The central axis 164 can be parallel to an extruder (not shown). For purpose of understanding and illustration only and not limitation, the vertical rotation wheel can have a general arrangement similar to that of a Ferris wheel. The mold assembly thus can be used to form the container body 100 through a blow molding manufacturing process. During the blow molding process, a suitable material, such as a plastic material, can be heated to a soften or molten state and formed into a preform tube shape or parison of material, such as by extrusion. The preform can be disposed, e.g. directly from the extrusion station 501, into the cavity 152 of the mold assembly 150 along the vertical rotation wheel 160. The mold sections can then be closed together to create the mold cavity corresponding to the container of the disclosed subject matter having some or all of the features described above. During rotation along the vertical rotation wheel 160, the preform can then be inflated to assume the shape of the cavity and cooled to form a container body 100. Once an ejection station 502 is reached along the vertical rotation wheel, the plurality of mold sections 154', 154" can be configured to open or move apart such that the container body is initially held within a top section 154' of the plurality of mold sections 154', 154". Due to the configuration disclosed herein the container body 100 can then release from the top section 154' wherein the finish portion 130 first drops due to gravity while generally pivoting about the base portion. The container body can then drop, e.g., by the force of gravity, into a slide or conveyor for transport to a further processing station.

As previously noted, the configuration of the base portion and concave rib as disclosed herein provides surprising benefits over conventional container configurations. For example, it has been observed in conventional container configurations that a lowest rib on a container body can cause the container to wedge between a first protrusion with the mold cavity configured to form the lowest rib and a second protrusion with the mold cavity configured to form a contoured base recess. This wedging or interference effect can cause the container to remain in the mold through the ejection station 502, which can result in a disruption in the manufacturing process.

Figure 8:
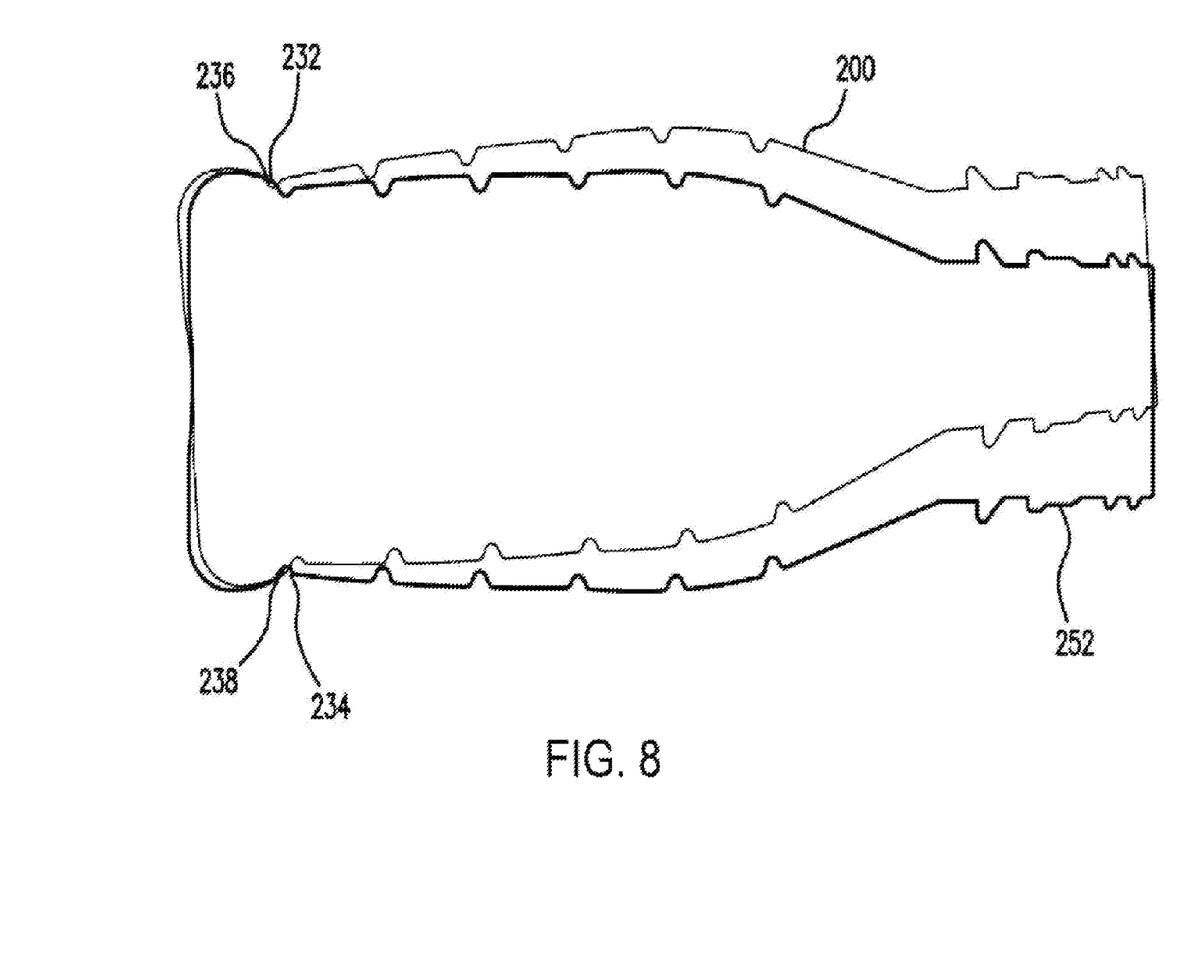
FIG. 8 is an ejection analysis model of a cross-sectional front view of a container with a conventional rib configuration.
Figure 9:
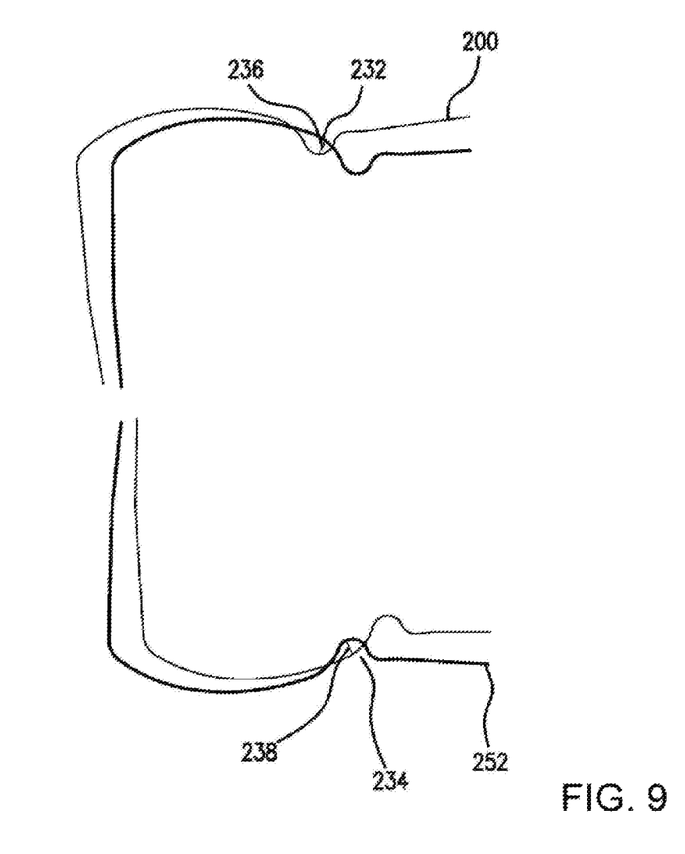
FIG. 9 is a partial view of a lower portion of the ejection analysis model of FIG. 8.

For further illustration and understanding of this wedging effect, FIGS. 8-9 provide the results of an interference ejection analysis and a finite element analysis of a conventional rib configuration. For purpose of comparison the analyses were performed on a test container 200 with a low rib and a pronounced base (i.e., wherein the ratio of maximum base recess height to low rib height is between 1:3 and 1:5) and overall dimensions substantially similar to a container of the disclosed subject matter as set forth in FIGS. 1-6 above. However, unlike the concave rib as disclosed herein, a conventional lowermost rib configuration was provided for test container 200, wherein the rib had a concave, symmetric, and sideways U-shaped profile in side cross-sectional view.

FIG. 8 and FIG. 9 illustrate an ejection analysis of the test container 200 having additional portions 252 (e.g., a finish portion illustrated in FIG. 8 and a sidewall illustrated in FIG. 9) and a corresponding mold (not shown). The ejection analysis was taken at the test mold parting line wherein the mold and the test container 200 were analyzed during ejection to show the interference at the first ejection portion 232 and the second ejection portion 234. The maximum interference is illustrated at the first ejection portion and the second ejection portion by interference lines 236 and 238, respectively. The interference lines measure about 0.042 inches, which was determined to be sufficient to prevent a container from properly ejecting from the mold.

Furthermore, a finite element analysis model was also performed to determine maximum Von-Mises stresses on the simulated test container 200 during release from the mold. The results on the test container 200 show high stress points on or near a lowest rib. Specifically, the stresses at each portion 232, 234 were determined to be between 2500 and 4080 pounds per square inch. This stress can cause a container to not properly eject from the mold.

By contrast, the container with the base and rib configurations as disclosed herein has been proven to overcome the ejection issues illustrated by FIGS. 8-9.

In addition to the subject matter disclosed above, various types of additional ribs, hot-fill processes, and structure features can also be incorporated into the disclosed subject matter. For example, and not by way of limitation, reference to such additional features and details can be found in, for example, Int. Pub. No. WO 2013/025463 and U.S. Pat. No. 9,296,539, each of which is incorporated by reference herein in its entirety.

In addition to the embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A container comprising:
   a body having a compartment defined therein, the body including a base portion defining a closed end, a finish portion defining an open end opposite the base portion, and a sidewall between the base portion and the finish portion;
   the base portion having a support surface defining a reference plane and a contoured base recess extending inwardly from the support surface to a maximum base recess height "$h_{brmax}$" from the reference plane; and
   the sidewall having a concave rib extending circumferentially around the body, wherein a center of the concave rib in side cross-section is disposed at a rib height "$h_r$" from the reference plane, wherein the ratio of the maximum base recess height to the rib height "$h_{brmax}:h_r$" is between 1:3 and 1:5, and
   the concave rib in side cross-section comprises a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees.

2. The container of claim 1, wherein the concave rib in side cross-section has an overall depth "d" of 0.15 inches to 0.20 inches from the outer edge of the sidewall.

3. The container of claim 1, wherein $h_{brmax}:h_r$ is about 1:5.

4. The container of claim 1, wherein $r_1$ is about 0.10 inches.

5. The container of claim 1, wherein the angle "a" is about 28 degrees.

6. The container of claim 1, wherein the concave rib in side cross-section has a radiused concave surface extending from the angled inner surface, the radiused concave surface has a radius of curvature "$r_2$," of at least 0.01 inches.

7. The container of claim 1, wherein the overall height of the container from the reference plane to an upper edge of the finish portion is "h" and an overall width of the container is "w," and the ratio of the overall height to overall width "h:w" is about 2.9:1.

8. The container of claim 1, wherein the container comprises a material selected from the group of high density polyethylene, medium density polyethylene, low density polyethylene, polypropylene, polycarbonate, polystyrene, extrudable polyethylene terephthalate, and mixtures, blends, or copolymers thereof.

9. The container of claim 1, wherein the container is formed from a mold assembly operatively coupled to a vertical rotation wheel.

10. The container of claim 1, wherein the container body is configured to undergo elevated temperature processing and also configured to undergo cooling processing.

11. The container of claim 1, wherein the compartment defined by the container body is configured to contain fluids of between about 8 fluid ounces and about 24 fluid ounces.

12. The container of claim 1, wherein the sidewall has one or more circumferential ribs separate from the concave rib.

13. The container of claim 12, wherein the one or more circumferential ribs is or are disposed above and farther from the base portion than the concave rib.

14. The container of claim 12, wherein at least one of the concave rib and the one or more circumferential ribs have fluted or column configurations.

15. The container of claim 12 wherein at least one of the one or more circumferential ribs has a concave, symmetric, and sideways U-shaped profile protruding into the sidewall when viewed in side cross-section.

16. The container of claim 1, wherein the finished portion includes a threaded portion configured to receive a plastic or metallic threaded cap or lid.

17. The container of claim 1, wherein the contoured base recess is configured to function as a diaphragm so as to flex and accommodate for pressure differentials.

18. A method of making a container comprising:
- disposing a polymeric material in a mold assembly having a cavity configured to form a container comprising:
  - a body having a compartment defined therein, the body including a base portion defining a closed end, a finish portion defining an open end opposite the base portion, and a sidewall between the base portion and the finish portion;
  - the base portion having a support surface defining a reference plane and a contoured base recess extending inwardly from the support surface to a maximum base recess height "$h_{brmax}$" from the reference plane; and
  - the sidewall having a concave rib extending circumferentially around the body between the base portion and the sidewall, wherein a center of the concave rib in side cross-section is disposed at a rib height "$h_r$" from the reference plane, wherein the ratio of the maximum base recess height to the rib height "$h_{brmax}:h_r$" is between 1:3 and 1:5, and
  - the concave rib in side cross-section comprises a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees;
- inflating the polymeric material in the mold assembly to form a blow-molded article having a configuration conforming to the cavity; and
- removing the article from the mold assembly.

19. A mold assembly to form a container, the mold assembly comprising:
- a plurality of mold sections, the plurality of mold sections, when assembled, defining a cavity configured to form a container comprising:
  - a body having a compartment defined therein, the body including a base portion defining a closed end, a finish portion defining an open end opposite the base portion, and a sidewall between the base portion and the finish portion;
  - the base portion having a support surface defining a reference plane and a contoured base recess extending inwardly from the support surface to a maximum base recess height "$h_{brmax}$" from the reference plane; and
  - the sidewall having a concave rib extending circumferentially around the body between the base portion and the sidewall, wherein a center of the concave rib in side cross-section is disposed at a rib height "$h_r$" from the reference plane, wherein the ratio of the maximum base recess height to the rib height "$h_{brmax}$" is between 1:3 and 1:5, and
  - the concave rib in side cross-section comprises a radiused transition surface extending from the base portion to an angled inner surface, the radiused transition surface has a radius of curvature "$r_1$" of at least 0.10 inches and the angled inner surface has an angle "a" relative to the reference plane of between 28 degrees and 80 degrees.

20. The mold assembly of claim 19, wherein the mold assembly is operatively coupled on a vertical rotation wheel.

\* \* \* \* \*